United States Patent
Collins et al.

(10) Patent No.: US 10,262,027 B2
(45) Date of Patent: Apr. 16, 2019

(54) TRANSFORMING QUERIES IN A MULTI-TENANT DATABASE SYSTEM

(71) Applicant: salesforce.com, inc., San Francisco, CA (US)

(72) Inventors: Jesse Collins, San Francisco, CA (US); Jaikumar Bathija, Fremont, CA (US)

(73) Assignee: salesforce.com, inc., San Francisco, CA (US)

(*) Notice: Subject to any disclaimer, the term of this patent is extended or adjusted under 35 U.S.C. 154(b) by 458 days.

(21) Appl. No.: 14/802,144

(22) Filed: Jul. 17, 2015

(65) Prior Publication Data

US 2015/0324421 A1   Nov. 12, 2015

Related U.S. Application Data

(63) Continuation of application No. 12/977,041, filed on Dec. 22, 2010, now Pat. No. 9,122,722.

(60) Provisional application No. 61/349,126, filed on May 27, 2010.

(51) Int. Cl.
*G06F 7/00* (2006.01)
*G06F 17/30* (2006.01)

(52) U.S. Cl.
CPC .. *G06F 17/30398* (2013.01); *G06F 17/30333* (2013.01); *G06F 17/30448* (2013.01); *G06F 17/30463* (2013.01); *G06F 17/30622* (2013.01); *G06F 17/30867* (2013.01); *G06F 17/30389* (2013.01); *G06F 17/30442* (2013.01)

(58) Field of Classification Search
CPC .................................................. G06F 17/30389
USPC ........................................................ 707/713
See application file for complete search history.

(56) References Cited

U.S. PATENT DOCUMENTS

| 5,548,758 | A | * | 8/1996 | Pirahesh .......... G06F 17/30454 |
| 5,577,188 | A | | 11/1996 | Zhu |
| 5,608,872 | A | | 3/1997 | Schwartz et al. |
| 5,649,104 | A | | 7/1997 | Carleton et al. |
| 5,715,450 | A | | 2/1998 | Ambrose et al. |
| 5,761,419 | A | | 6/1998 | Schwartz et al. |
| 5,819,038 | A | | 10/1998 | Carleton et al. |
| 5,821,937 | A | | 10/1998 | Tonelli et al. |
| 5,831,610 | A | | 11/1998 | Tonelli et al. |
| 5,873,096 | A | | 2/1999 | Lim et al. |
| 5,918,159 | A | | 6/1999 | Fomukong et al. |
| 5,963,953 | A | | 10/1999 | Cram et al. |
| 5,995,957 | A | * | 11/1999 | Beavin ............. G06F 17/30469 |
| 6,092,083 | A | | 7/2000 | Brodersen et al. |
| 6,161,149 | A | | 12/2000 | Achacoso et al. |

(Continued)

OTHER PUBLICATIONS

USPTO, Non-final Office Action for U.S. Appl. No. 12/977,041, dated May 10, 2012.

(Continued)

*Primary Examiner* — Eliyah S. Harper (74) *Attorney, Agent, or Firm* — Lorenz & Kopf, LLP (57) ABSTRACT

In a method, system, and computer-readable medium having instructions for executing a query in a database system, a query request is received with a query predicate to filter data returned in response to the query request and the query predicate has a formula, the query request is transformed to a transformed query request by preprocessing the formula in the query predicate, and the query request is optimized using the transformed query request.

17 Claims, 6 Drawing Sheets

(56) References Cited

U.S. PATENT DOCUMENTS

| | | | |
|---|---|---|---|
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,263,332 B1 | 7/2001 | Nasr et al. | |
| 6,263,345 B1* | 7/2001 | Farrar | G06F 17/30454 |
| | | | 700/110 |
| 6,266,669 B1 | 7/2001 | Brodersen et al. | |
| 6,272,487 B1* | 8/2001 | Beavin | G06F 17/30469 |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,529,896 B1 | 3/2003 | Leung et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,665,664 B2* | 12/2003 | Paulley | G06F 17/30448 |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,965,891 B1 | 11/2005 | Jakobsson et al. | |
| 6,996,557 B1* | 2/2006 | Leung | G06F 17/30454 |
| 7,062,502 B1 | 6/2006 | Kesler | |
| 7,069,231 B1 | 6/2006 | Cinarkaya et al. | |
| 7,177,855 B2* | 2/2007 | Witkowski | G06F 17/246 |
| | | | 707/718 |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 7,945,578 B2* | 5/2011 | Leung | G06F 17/30616 |
| | | | 707/769 |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,285,711 B2* | 10/2012 | Bordawekar | G06F 17/30935 |
| | | | 707/713 |
| 8,446,299 B2 | 5/2013 | van den Boom | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2002/0188600 A1* | 12/2002 | Lindsay | G06F 17/30466 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0220908 A1 | 11/2004 | Finlay et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2006/0235831 A1 | 10/2006 | Adinolfi et al. | |
| 2007/0219951 A1 | 9/2007 | Ahmed et al. | |
| 2007/0276279 A1* | 11/2007 | Echauz | A61B 5/0476 |
| | | | 600/544 |
| 2008/0010241 A1 | 1/2008 | McGoveran | |
| 2008/0235181 A1* | 9/2008 | Faunce | G06F 17/30469 |
| 2008/0249972 A1 | 10/2008 | Dillon | |
| 2008/0313134 A1 | 12/2008 | Lei | |
| 2009/0063414 A1 | 3/2009 | White et al. | |
| 2009/0100342 A1 | 4/2009 | Jakobson | |
| 2009/0177640 A1* | 7/2009 | Verbaere | G06F 17/30401 |
| 2009/0177744 A1 | 7/2009 | Marlow et al. | |

(56) References Cited

U.S. PATENT DOCUMENTS

| | | | |
|---|---|---|---|
| 2010/0241641 A1* | 9/2010 | Byun | G06F 17/3051 |
| | | | 707/757 |
| 2010/0332503 A1 | 12/2010 | Buckley et al. | |
| 2011/0122003 A1* | 5/2011 | Van Den Boom | H03M 7/30 |
| | | | 341/106 |
| 2011/0247051 A1 | 10/2011 | Bulumulla et al. | |
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |

OTHER PUBLICATIONS

USPTO, Final Office Action for U.S. Appl. No. 12/977,041, dated Oct. 17, 2012.
USPTO, Non-final Office Action for U.S. Appl. No. 12/977,041, dated Mar. 12, 2013.
USPTO, Final Office Action for U.S. Appl. No. 12/977,041, dated Aug. 26, 2013.
USPTO, Non-final Office Action for U.S. Appl. No. 12/977,041, dated Mar. 14, 2014.
USPTO, Non-final Office Action for U.S. Appl. No. 12/977,041, dated Sep. 3, 2014.
USPTO, Final Office Action for U.S. Appl. No. 12/977,041, dated Jan. 15, 2015.
USPTO, Notice of Allowance for U.S. Appl. No. 12/977,041, dated Apr. 23, 2013.

* cited by examiner

TRANSFORMING QUERIES IN A MULTI-TENANT DATABASE SYSTEM

CLAIM OF PRIORITY

This application claims the benefit of U.S. application Ser. No. 12/977,041 entitled "Transforming Queries in a Multi-Tenant Database System," filed Dec. 22, 2010 which claims benefit of U.S. Provisional Patent Application 61/349,126 entitled "Methods and Systems for Optimizing Queries in a Multi-tenant Database System Environment," filed May 27, 2010, Collins et al., the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to transforming queries in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

A query optimizer may be used to optimize the query to choose certain data paths. The efficient retrieval of accurate information and subsequent delivery of this information to the user system is desirable. Unfortunately, conventional database approaches for the query optimizer might become inefficient because the query optimizer relies on selection of indexes with an optimizer unaware that organizations may share a database.

Accordingly, it is desirable to provide techniques enabling a query optimizer of the database system to improve data path selection of the database system.

BRIEF SUMMARY

In accordance with embodiments, there are provided methods, computer readable mediums, systems, and apparatuses for optimizing queries in a multi-tenant database system environment.

In an embodiment and by way of example, a method for optimizing queries in a multi-tenant database system environment is provided. In a method, system, and computer-readable medium having instructions for optimizing a query in a database system, a query request is received with a query predicate to filter data returned in response to the query request and the query predicate has a formula, the query request is transformed to a transformed query request by preprocessing the formula in the query predicate, and the query request is optimized using the transformed query request.

While one or more implementations and techniques are described with reference to an embodiment in which for optimizing queries in a multi-tenant database system environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems, computer readable mediums with instructions, computer program products, and methods are provided for transforming queries in a database system. In one or more embodiments, query requests are optimized by transforming the query request for a multi-tenant database system. It may be desirable to transform a query for retrieving data of a tenant of a multi-tenant database system when a query request has a formula in a query predicate filter of the query request. The query predicate of a query request may provide criteria for determining or filtering data retrieved from the database in response to the query request. The transformed query request may aid in identification of further optimizations for the original query request by the query optimizer.

The query request may have a query predicate that filters the data rows or records returned from a database entity using one or more formulas in the query predicate. The query predicate is a portion of the query request that may specify criteria that data rows adhere to in order to be returned from the database in response to the query request. A formula may be comprised of one or more expressions, and each expression and/or combination of expressions may be evaluated to be a result or a condition. The formula may be an expression in a query predicate that takes an input value of data and may produce at least one result when evaluated. Embodiments may have input values for formulas of database field values from one or more database tables. For example, a query request "select Account_id, Contact_id from Contact where Contact.Name='Salesforce';" has a query predicate with a formula "Contact.Name='Salesforce'" and receives an input value of "Contact" table database field input value for "Name" for evaluation. In one or more embodiments, the formula initially may be provided in the query request to be evaluated on-the-fly or at run-time and/or provided as a definition for a database field referenced in the query request to be evaluated on-the-fly or at run-time. As will be discussed further below in more detail, one skilled in the art will recognize that a query may have a query predicate, which in turn may include a formula.

Embodiments may process the formula to transform the query request in order to optimize and/or identify optimizations for the query request. The formula may be preprocessed and transformed prior to optimization by the query optimizer. The transformation preprocessing may be viewed as performing an inverse function on a function, reversing the formula, preprocessing of the formula for a database field, replacing a database field with a direct reference to the underlying database field and/or underlying formula defined for the database field in the query predicate, and/or performing a reference lookup of a query language function when it is referenced in a query predicate for a database query request.

In a relational database, an entity may be a database table or view. In an object database, the entity may map to an object class. The database table may be represented with columns that are fields for the database table and rows that represent the records of the database table. Each row or record in the database table may have one or more values for the database fields of the database table. In an embodiment, the database record fields may be defined by formulas that are evaluated and the evaluation of the formula determines the value for the database field. Although examples provided throughout may refer to an entity as a database table, those skilled in the art will recognize that there are various ways an entity of a database design may be implemented.

In one or more embodiments, the query may involve retrieving data for a database column or field that is defined by the formula, and the formula may be an expression that references values of another database column or field in a database table. An index may be created for a database column or field of a database table to optimize the retrieval of data when the query request filter references the database column. In a preferred embodiment, use of the index may allow for retrieval of data without a full scan of a database table and/or a full scan of data accessible to a particular tenant. Indexes may be created for the entire database column (e.g. for all data rows) and/or for a portion of the database column (e.g. a subset of data rows). For example, the index may be created for a subset of values for a column of a database table that are for a particular tenant of a multi-tenant database system.

The index may not be identified for use with a query request when the query request does not reference the database column directly and/or the formula that references the column is not evaluated or retrieved until runtime. In one or more embodiments, the query request may be transformed to reference an underlying database field that is referenced in the formula, and a query optimizer may identify the index to use for the underlying database field that may previously have been missed without the transformation.

In one or more embodiments, a database table may be a custom entity or have custom fields for a tenant. An implementation of a custom entities and fields are described in U.S. patent application Ser. No. 12/764,780, entitled "CUSTOM ENTITIES AND FIELDS IN A MULTI-TENANT DATABASE SYSTEM," filed on Apr. 21, 2010, which is incorporated herein by reference in its entirety.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. While the present invention is described with reference to an embodiment in which techniques for optimizing queries are implemented in a system having an application server providing a front end for an on-demand database service capable of supporting multiple tenants, the present invention is not limited to multi-tenant databases nor deployment of application servers. Embodiments may be practiced using other database architectures, i.e., ORACLE®, DB2® by IBM and the like without departing from the scope of the embodiments claimed. As used herein, the term query plan refers to a set of steps used to access information in a database system.

As used herein, the term "user" is construed broadly to describe an individual, a group of individuals, and/or any other set of users that access the online service system. In the following examples, one or more implementations are illustrated for optimizing queries. In alternate implementations, the illustrated processes and process steps may be combined into fewer steps, divided into more steps, and/or performed in a different sequence.

Figure 1:
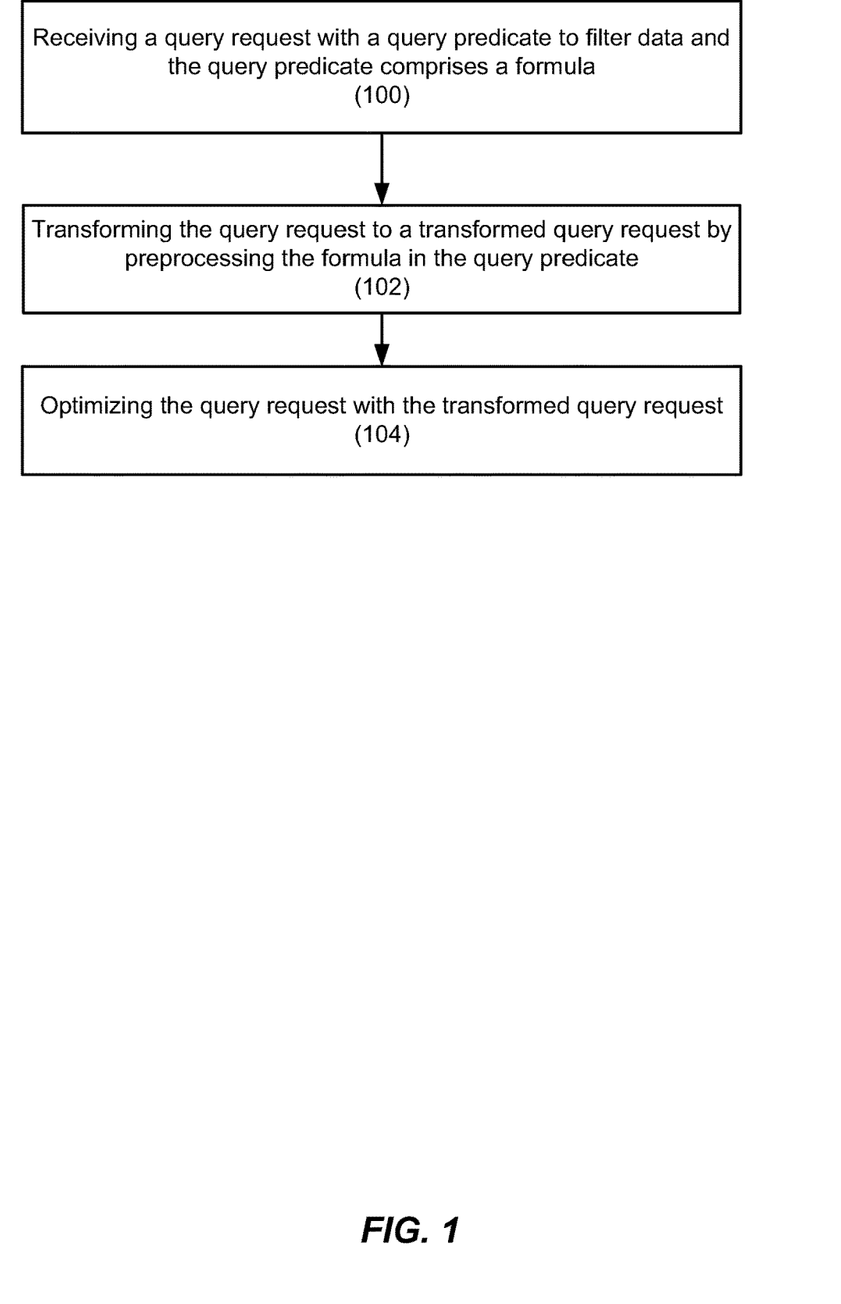
FIG. 1 illustrates an example of a simplified flow diagram for an embodiment of transforming queries in a multi-tenant database system.

FIG. 1 illustrates an example of a simplified flow diagram for an embodiment of transforming queries in a multi-tenant database system. A query request with a query predicate to filter data returned in response to the query request is received (100). The query predicate is a portion of the query request that may specify criteria that data rows adhere to in order to be returned from the database for the query request.

The query predicate may have one or more criterion (e.g. predicates) joined by "AND" or "OR" to form the query predicate. The query predicate may be placed immediately after a "WHERE" clause in SQL or Salesforce Object Query Language (SOQL) query request. The query predicate may have a formula that can be evaluated to help filter data returned in response to the query request to the database. For example, a query request "select Account_id, Contact_id from Contact where Contact.Name='Salesforce';" may have a filter predicate "Contact.Name='Salesforce'" that filters data rows returned from the Contact table. A first database field "Name" for a Contact table may be defined with the formula "Contact.Name=Account.Name," with an input value for the formula of the value for the database field of Name for the Account table.

The formula may be one or more expressions and each expression within the formula can be evaluated to be a value or a condition. The formula may have mathematical expression(s) that produces a numerical result, a conditional expression(s) that produces a Boolean result (e.g. True/False, 1/0), or a textual expression that produces a textual result (e.g. concat("string1", "string2") may evaluate to 'string1string2'). In one or more embodiments, the formula may use a function provided by a query language including, but not limited to, decode, truncate, concat, or any other type of function provided by a query language.

An implementation of formulas is described in U.S. patent application Ser. No. 11/592,539, entitled "IMPLEMENTING FORMULAS FOR CUSTOM FIELDS IN AN ON-DEMAND DATABASE," filed on Nov. 3, 2006, which is incorporated herein by reference in its entirety.

The query request may have a query predicate that references another database field within a database table. The first database field may be defined in the database table as a formula itself that is to be evaluated on-the fly or at runtime. The first database field formula may have a reference to a second database field. For example, the formula for a first database field for a Contact table may be "Contact.Name=Account.Name" and a query request "select Account_id, Contact_id from Contact where Contact.Name='Salesforce';" may have a filter predicate "Contact.Name='Salesforce'." Continuing with the example, the filter predicate references the first database table (e.g. Contact) that has a formula that references a second database field "Account.Name." In an embodiment, the first database table may have a relationship to the second database table, such as the first database table may have a foreign key for the second database table. In another embodiment, the formula may reference a database field within the same table.

In one or more embodiments, the formulas may be created for custom fields of a database table in a multi-tenant database system. The custom fields and custom entities a multi-tenant database environment may be accessible by a single tenant or a subset of tenants. Each tenant may have their own database field values or formulas defined in a custom field of a database table. Approaches to optimizing formulas in a query predicate may involve application of an index to a formula defined within a database field. In an embodiment of a multi-tenant database, the custom database field may not have the same formula definition for each tenant and an appropriate index may not be defined or easily identified for the database field or column. For example, an index may need to be generated for each tenant as opposed to creating an index for the database field or column for the entire table because the user may only be permitted to access to data for a particular tenant. In another example, the same index may not be used because each custom field may have a different value or different formula definition for each tenant.

In one or more embodiments, the custom fields for a database table may be stored in a separate table from the database table. For example, the Account table may have a custom database field and the custom database field may be stored in another database table that is separate from the Account table. An index may be available for the custom field for the Account table but the index for the custom field may not be identified without transformation preprocessing. Transformation preprocessing on a formula with the custom field may be performed and the index for the custom database field may be identified.

The query request may be a query request that is to be executed against a database. The query request may be received in the form of a query language and/or created with the use of a user interface. In one or more embodiments, the query may be received in the form of a SQL query, a SOQL query, generated with a list view builder, generated with a report builder, and/or generated with any other user interface. In a preferred embodiment, the query request may be received in the form of a SOQL query and the query may be translated into a SQL query request to be executed against the database.

In a preferred embodiment, the data rows being retrieved with the query request may records for a database supporting Customer Relationship Management (CRM) software. In a preferred embodiment, the query requests may involve records or database tables that are for leads, contacts, opportunities, campaigns, accounts, or any other type of entity that may be useful for sales.

The query request is transformed to a transformed query request by preprocessing the formula in the query predicate (102). The transformation preprocessing may be applied in accordance with the formula(s) within the predicate. The transformation preprocessing may be viewed as reversing the formula, preprocessing of the formula for a database field, replacing a database field with a direct reference to the underlying database field or formula defined for the database field in the predicate, or performing a reference lookup of a function when it is referenced in a query predicate for a database query request.

A query predicate may have one or more formulas or the formula itself may be made up of one or more formulas to provide the criteria of the query predicate. The transformed query request may have one or more formulas that are transformed during the preprocessing of the formula. In an embodiment, the transformations for one formula within the query predicate may affect the transformations for the remaining predicates. In another embodiment, transformation preprocessing may not be performed for a formula because the transformation may not be the optimal solution for evaluation of the entire formula within the query request.

The query request may be transformed to a transformed query request by replacing the reference to the first database field within a formula with at least one reference to the second database field. For example, a query predicate may have a reference to a first database field in a formula and the first database field may be defined in the table with a formula that references a second database field, and the query request may be transformed to replace the first database field with the formula and directly reference the second database field in the transformed query request. For example, the formula for a first database field for a Contact table may be "Contact.Name=Account.Name" and a query request "select Account_id, Contact_id from Contact where Contact.Name='Salesforce';" may have a filter predicate "Contact.Name='Salesforce'." Continuing with the example, the filter predicate references the first database table (e.g. Contact) has a formula that references a second database field "Account.Name," and the first database field in the query predicate may be replaced in a transformed query request as follows: "select Account_id, Contact_id from Contact where Account.Name='Salesforce'."

The query request may be transformed to a transformed query by reversing the functionality of a function within a formula or preprocessing in accordance with the functionality of the function. For example, a formula with a truncation of a date (e.g. trunc(date)) within the query predicate may be transformed to a transformed query request with a query predicate that filters data on all values between the minimum date and time and the maximum date and time for the truncated date, inclusive. The query request may be transformed to a transformed query request by performing a reverse lookup and/or performing an inverse function with the values of decode function and the value provided in the query predicate.

The query request may be optimized using the transformed query request (104). The transformed query request may hint at or provoke the use of indexes that may not have been identified with the original query request. The query optimizer may utilize an index that may not have been recognized by the optimizer with the original query request. For example, the query optimizer may utilize an index for the second database field that is referenced in the transformed query request after the replacement of the first database field with the formula including the second database field. In a preferred embodiment, use of the index may reduce the number of full scans of a database table.

The optimized query request may be used to generate a SQL database request and may be executed against the database. Although use of the index is provided as an example of an optimization performed after transformation of the query request, those with skill in the art will recognize that indexes may be used to optimize the query for a variety of reasons and the identification to use and use of indexes is not limited to transformed query requests.

Figure 2:
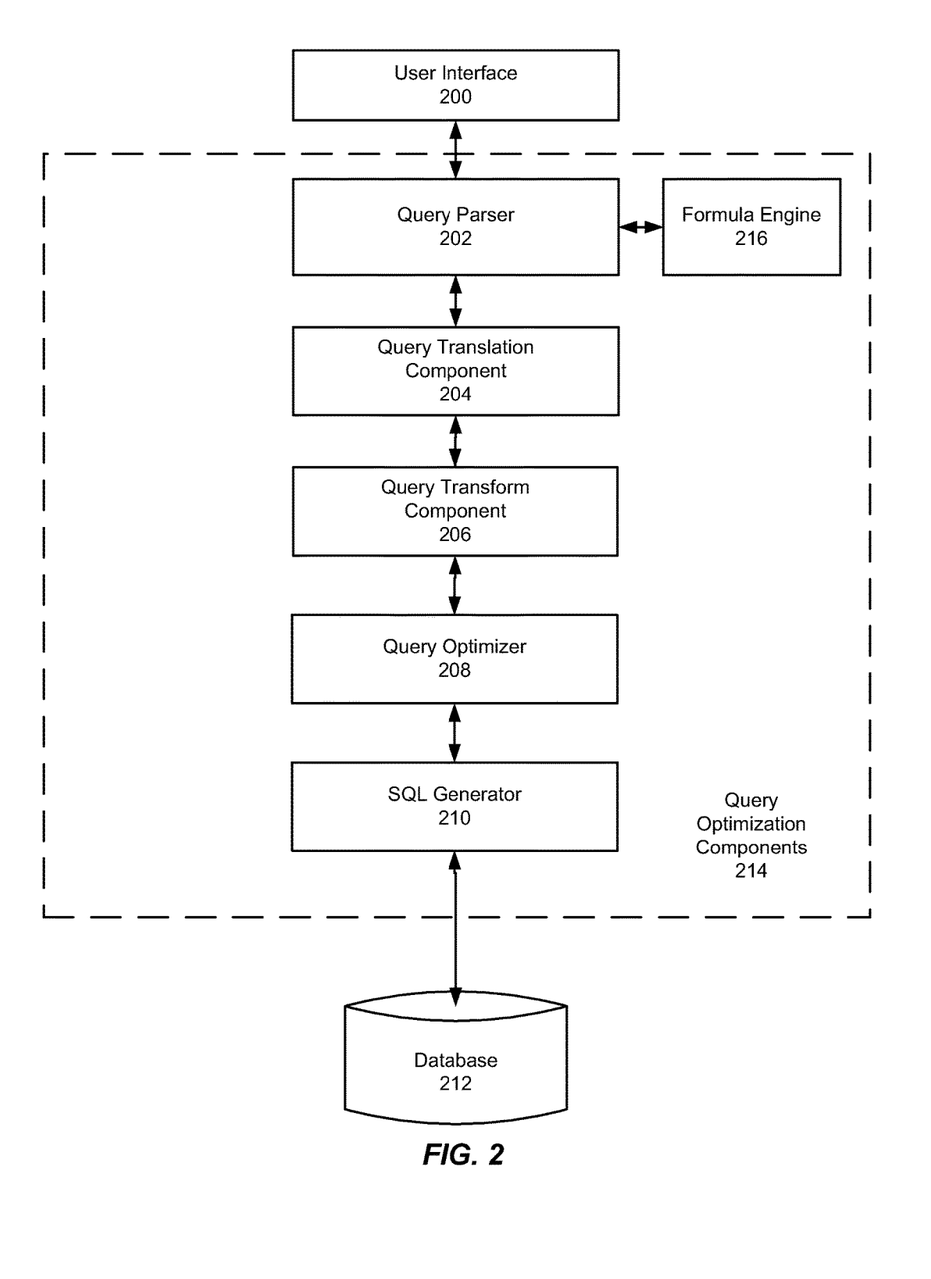
FIG. 2 illustrates a block diagram for an embodiment of transforming queries in a multi-tenant database system.

FIG. 2 illustrates a block diagram for an embodiment of transforming queries in a multi-tenant database system. A User Interface 200 may be used to create tables in the database, create formulas for database fields, create custom fields and tables, and create queries for execution against the database. In an embodiment, the user interface may be used to create SOQL queries. In one or more embodiments, a user interface builder may be used, such as a report builder or a list view builder. A first query language request (e.g. a SOQL query request) may be compiled or translated into a second query language request (e.g. a SQL query request).

One or more of the following Query Components 214 for optimization of a query request: a Query Parser 202, a Query Translation Component 204, a Query Transform Component 206, a Query Optimizer 208, and/or a SQL Generator 210. In one or more embodiments, an Application Server may use the Query Components 214 as a compiler for translating a first query language to a second query language. For example, the compiler may translate SOQL query requests into SQL query requests for a relational database. The query may be received by a Query Parser 202 to parse the query request and recognize database tables and database fields referred to in the query request. Parsing may entail the process of analyzing the text to identify tokens (e.g. words and expressions) and identifying grammatical structures in the query request in accordance with a provided grammar.

Those with skill in the art will recognize that a variety of parsing tools may be used to perform lexical analysis, syntactic analysis, and/or semantic analysis to parse the query request. The Query Parser 202 may store the parsed query request in a data structure, such as a Parse Tree, for further compilation.

In an embodiment, the Query Parser 202 may use a Formula Engine 216 to flatten nested formulas. A nested formula is formula that refers to a database field in the formula that is also defined to by a formula. The Formula Engine 216 may flatten the nested formulas so to refer to all underlying fields in the formulas. For example, a database field "Opportunity_tbl.Name" may be defined to have the formula "Account_tbl.Name" and "Account_tbl.Name" itself may be defined by the formula "Contact_tbl.Name." The Formula Engine 216 may flatten the formula for database field "Opportunity_tbl.Name" to the underlying database formula in the chain of nested formula to "Contact_tbl.Name."

The query request may then be translated to refer to the query level objects with the Query Translation Component 204 for each table referenced in the query request. In one or more embodiments, internal objects may be added or referred to in the query request and an internal query definition for the query request may be defined. For example, tables that provide security and/or sharing restrictions may be added to the query request. In some embodiments, internal tables that refer to custom fields or tables may be added by the Query Translation Component 204. For example, in an implementation for a multi-tenant database, custom fields or columns of a database table may be stored in a different table and reference to the query level object storing the custom fields for the database table may need to be referred to in the query request.

A Query Transform Component 206 may transform query requests, such as to directly reference database fields that are referred to in a formula of another database field. The query request may be transformed by preprocessing the formula within a query predicate. Preprocessing the formula may include, but is not limited to, reversing the functionality of a function, replacing database fields referred to in the formula, performing reverse lookups, removing unnecessary steps in a function or formula, or any other preprocessing of the formula that would produce an optimized query request.

A Query Optimizer 208 may be used to select the optimal data path for the query request, such as the tables and indexes to access for optimal retrieval of information for the given query request. Examples of optimizations that the Query Optimizer 208 may provide include, but are not limited to, determining a selective filter, selecting indexes, choosing where to apply hash joins and/or nested loop joins, determine where to perform a full table order, and/or any other optimizations for selecting a data path. In an embodiment, hints may be provided in the SQL that indicate the main parts of the query plan used by a query optimizer provided by a database provider, specify optimizations to user, and/or limit the scope of optimizations considered by the query optimizer from a database provider.

A SQL Generator 210 may be used to produce the query request string to be sent to the Database 212 for execution. In an embodiment, hints may be provided in the query request string sent to the Database 212 to indicate the main parts of the query plan to be used by the internal query optimizer provided by the database provider. The Database 212 may be any collection of data, such as a relational database or an object oriented database. Execution of the query request against the database may cause retrieval of data in accordance with the criteria within the query predicate and return of a result set with data from the database.

Figure 3:
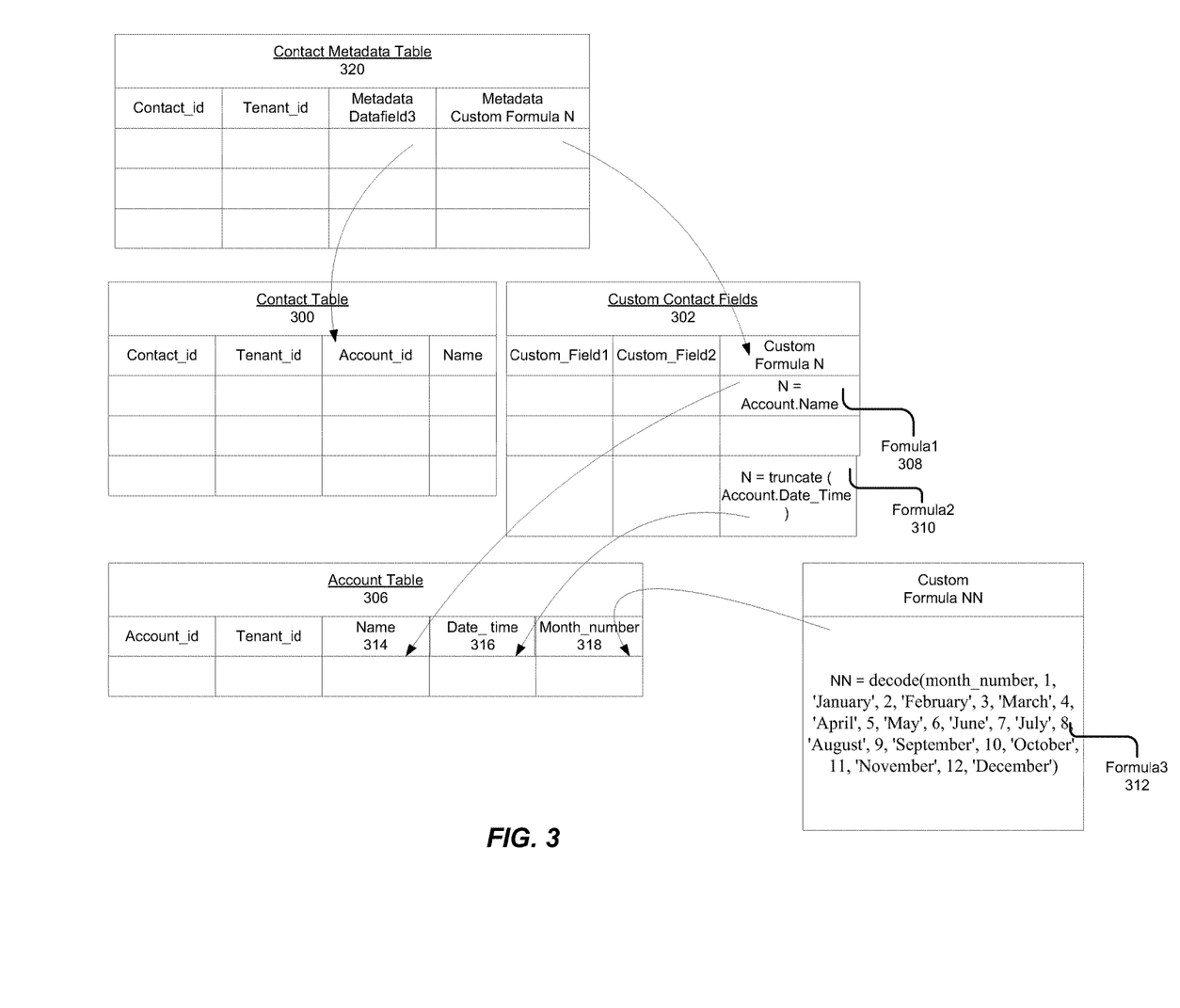
FIG. 3 illustrates an example of an implementation of entities for using an embodiment of transforming queries in a multi-tenant database system.

FIG. 3 illustrates an example of an implementation of entities for using an embodiment of transforming queries in a multi-tenant database system. In FIG. 3, a Contact Table 300 is a database table with fields: Contact_id, Tenant_id, Account_id, Custom_Field1, Custom_Field2, and CustomFormulaN. Custom_Field1, Custom_Field2, and CustomFormulaN are custom fields that may be stored in a separate table in the database, as illustrated with Custom Content Fields 302. Contact Table 300 has a related database table Account Table 306. The Account Table 306 has database fields: Account_id, Tenant_id, Name 314, Date_time 316, Month_number 318, and CustomFormulaNN. The Contact Table 300 has custom Formula1 308 "N=Account.Name" that directly references a database field "Name" 314 in the Account Table 306, as illustrated with "Account.Name" in the Formula1 308.

In one or more embodiments, metadata may be associated with the tables in a multi-tenant database system. The metadata associated with the tables may provide information about the database fields and the values of the database fields. For example, the Contact Table 300 has a Formula1 308 that refers to "Account.Name", and the metadata for the Contact Table 300 may indicate that the primary key for the Account data row with the "Account.Name" referred to in Formula1 308 is in the "Contact.Account_id" of the Contact Table 300. The metadata may be stored for by database table, by database field and/or by tenant in the database. For example, the Contact Metadata Table 320 may store metadata for each Contact and each Tenant. In the example, the Contact Metadata Table 320 stores metadata for Datafield 3 (e.g. Contact.Account_id) and Custom FormulaN (e.g. CustomContactFields.CustomFormulaN). The Contact Metadata Table 320 may store the relationship between the Contact.Account_id and Formula1 308 so that Formula1 may be evaluated with the correct Account data row.

The Contact Table 300 has custom Formula2 310 "N=truncate (Account.Date_time)" that directly references a database field "Date_time" 316 in the Account Table 306, as illustrated with "Account.Date_time" in Formula2 310. In an example, a query request "select A.Name From Contact C, Account A where N=Nov. 17, 2010 and C.Account_id=A.Account_id" may be received, where N is Formula2 310. The formula for N within the query predicate "where N=Nov. 17, 2010" may be transformed to directly reference the Account.Date_time field, and the query request may be transformed to "select A.Name from Contact C, Account A where Account.Date_time>=Nov. 17, 2010 00:00:00 and Account.Date_time<Nov. 18, 2010 00:00:00 and C.Account_id=A.Account_id.

In another example, a custom formula field formula may be defined that produces the date only part of a date time field. Continuing with the example, a "created_date_time" field of a database table may be defined as a DateTime datatype. A formula database field, "created_date_only," may be defined as "trunc(created_date_time)." In this case, when a query request with a query predicate that filters on "created_date_only=Nov. 17, 2010," an inference could be made as to the possible values of the DateTimes that are possible for Nov. 17, 2010 and the query predicate that filters on created_date_time in the query request may be transformed. By computing the minimum and maximum DateTimes that are able to truncate to Nov. 17, 2010, the following filter may be used in the transformed query request:

(created_date_time>=Nov. 17, 2010 00:00:00 and created_date_time<Nov. 18, 2010 00:00:00).

A received query request, such as the following:
"Select Name From Account Where trunc(created_date_time)=Nov. 17, 2010"
could be transformed to:
"Select Name From Account Where (created_date_time>=Nov. 17, 2010 00:00:00 and created_date_time<Nov. 18, 2010 00:00:00)."

Continuing with the example, if an index on the created_date_time column was created, then the transformed query request would allow or provoke an index range scan for scanning the data in the Account table for the day. In comparison, the original query may not provoke or enable a range scan. Further, it may be desirable to perform the range scan of an index and limit the range scan to just the matching data, as opposed to scanning the full index, and then filtering based on the trunc( ) formula expression.

The Account Table 306 has custom Formula3 312 "N=decode(month_number, 1, 'January', 2, 'February', 3, 'March', 4, 'April', 5, 'May', 6, 'June', 7, 'July', 8, 'August', 9, 'September', 10, 'October', 11, 'November', 12, 'December')" that references a database field "month_number" 318 in the Account Table 306, as illustrated with "month_number" in Formula3 312. In an example, preprocessing of the formula to create a transformed query request may include a simple mapping from one set of values to another. In the example, a formula has a "month_name" that maps integers into month names, "decode(month_number, 1, 'January', 2, 'February', 3, 'March', 4, 'April', 5, 'May', 6, 'June', 7, 'July', 8, 'August', 9, 'September', 10, 'October', 11, 'November', 12, 'December')." Then, given a query request with a query predicate that filters on the formula expression, say "month_name='August'", then a reverse mapping could be performed and used to infer a filter on the month_number column: month_number=8.

Then, we could take a query like:
"Select Name From Event Where decode(month_number, 1, 'January', 2, 'February', 3, 'March', 4, 'April', 5, 'May', 6, 'June', 7, 'July', 8, 'August', 9, 'September', 10, 'October', 11, 'November', 12, 'December')='August'
and turn it into a transformed query request, as follows:
"Select Name From Event Where month_number=8."

In the example, the basic algorithm may be to compute a reverse mapping of the original decode( ) expression's mapping. In another example, a decode expression could map to arbitrary SQL expressions and the individual SQL expressions may need to be transformed. A transformed query request may have query predicate based on the underlying database column with a value determined by applying the reverse mapping function to the original filter value.

In an embodiment, if the given filter value is not one of the possible outputs of the decode function (e.g. month_number is not 1-12), the query transformation may be aborted. In another example, a decode function may specify a default output value; and, if a query predicate of the query request filtered on <decode expression>=<default output value of the decode expression>, then the transformation may not be useful and the transformation may be aborted. In an embodiment, the problem with the query request may be identified and there may be error handling for the query request.

Figure 4:
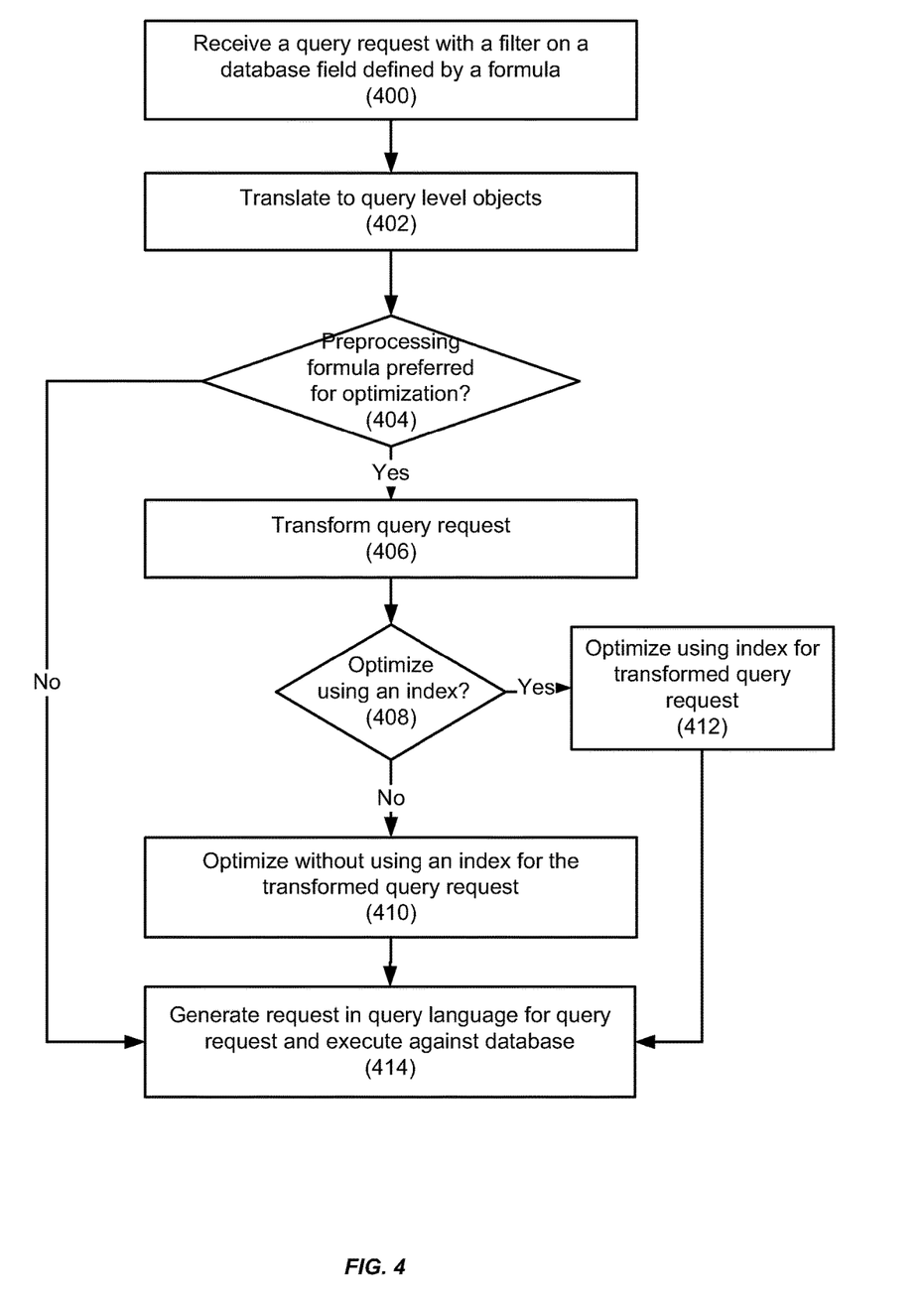
FIG. 4 illustrates an example of a flow diagram for an embodiment of transforming queries in a multi-tenant database system.

FIG. 4 illustrates an example of a flow diagram for an embodiment of transforming queries in a multi-tenant database system. A query request is received with a filter on a database field that is defined by a formula (400). The filter may be a query predicate in the query request that filters the data that is received from the database table with the criteria within the query predicate. In one or more embodiments, the database field is a custom database field in a multi-tenant database. In an implementation of custom database fields, the custom database field may be in a separate database table. The formula for the first database field in the may be a formula that relies on another database field for evaluation of the formula.

The query request may be translated to the query level objects (402). The query request may be parsed to determine the query level objects that may need to be relied on to execute the query request against the database. For example, an internal query definition for the query may be produced that includes objects for the database tables referenced in the query request, database tables for the underlying database fields referenced in the formula, database tables used for database tables used to identify relationships between tables, database tables for custom entities or database fields for the database table in the query request.

A determination is made as to whether preprocessing the formula is preferred for optimization of the query request (404). For example, if the formula is an expression that directly references a field of a database table, then it may be preferable to replace the formula with a direct reference to the field of the database table to ensure that an index on the field of the database table may be utilized.

If a determination is made not to process the formula (404), then a request is generated in a query language and executed against the database (414). In a preferred embodiment, a SQL query request will be generated from the original SOQL query request and executed against the database.

Continuing with FIG. 4, alternatively if a determination is made to process the formula (404), then the query request may be transformed (406). The formula for the first database field may be reversed to allow for identification of optimizations such as use of an index for a second database field. For example, the query request may be transformed to directly reference the second database field within the formula definition for the first database field.

A determination is made as to whether to optimize the query request using an index (408). If a determination is made to not use and index (408), then the query request may be optimized (410). The Query Optimizer 208 may optimize the query request and the SQL Generator 210 may generate a query request for the database in a query language and execute the request against the database (414).

Continuing with FIG. 4, alternatively, if a determination is made to use an index (408), then a query optimizer may use an index for the transformed query request (412). When a formula for the first database field is reversed to directly reference the second database field within the transformed query request, then the Query Optimizer 208 may utilize indexes for the second database field. The index may not have otherwise been identified because the formula for the first database field would not be evaluated until run-time, and the index would not have been identified in the prior optimization stage. The Query Optimizer 208 may also join in the table for underlying database field that may not have been identified without preprocessing the formula and transforming the request to reference the underlying database field in the formula.

A query request may be generated for the database in a query language and executed against the database (414). For example, a SQL Generator 210 may generate a query request in SQL and execute the request against the database.

Query Transformation to Optimize Filters on Spanning Formulas

Users may create formula fields that have formulas that may be computed from other fields. Formulas may be spanning, meaning that the formulas can refer to fields in a database table, such as another related table. For example, a customer may create a custom formula field on Contact table that is defined as Account.Name. A SQL expression may be generated by a query for the formula (e.g. in preparation for and/or during query execution), and the resulting SQL expression may result in blocking the use of index optimizations.

In one or more embodiments, a Query Transform Component 206, such as a query builder, may transform queries to convert filters on spanning formula fields into filters on the underlying field (e.g. in cases where the formula is a simple direct reference). In some embodiments, inspecting the formula definition, and rewriting the query at runtime to replace the formula with a direct field reference automatically may accomplish the transformation. The transformation may occur before the filters are passed into a Query Optimizer 208 and regular custom index, search name lookup, and other optimizations can be applied because the direct reference to the underlying field present in the formula may be recognized and/or hints for optimizations may be indicated.

For example, an example flow without the transformation, may include, but is not limited to, the following steps:

A user may define a custom formula spanning field with a direct reference, such as a Contact's database table field AccountName may have a formula defined as Account.Name, where Account is a database table and Name is a database field of the Account table.

A query request may be received in the Salesforce Object Query Language (SOQL) query language and the query request may have a filter on Contact.AccountName, such as "Select Name, Id from Contact where AccountName='Salesforce.com'" (e.g. "AccountName='Salesforce.com'" is the filter)

The query may be received by the Query Optimizer 208 as a query based on a single logical table, Contact, with a single filter on a database field defined by a formula, and AccountName, which is taken as an arbitrary SQL expression based on the Contact table.

Existing optimizations may not be applied to such arbitrary SQL expressions because the Query Optimizer 208 may not recognize that the AccountName references Account table database field Name. In this case, a query may be generated that scans all rows for the tenant/user in the Contact table, joins to the Account table to evaluate the SQL expression, and then applies a SQL where clause against the SQL expression.

The query may take a long time, due to the large amount of data scanned, and may return a small number of rows due to the highly specific filter. A full table scan of Account may be required because an index may not have been identified for the query request.

Continuing with the example, the flow with the optimization may include, but is not limited to the following steps:

A user defines a custom formula spanning field with direct reference, such as Contact's AccountName defined as Account.Name A user sends a SOQL query request with a filter on Contact.AccountName, such as "Select Name, Id from Contact where Account.Name='Salesforce.com'"

The Query Transform Component 206 inspects the filters in the query and transforms the query into another logical query before handing it off to the Query Optimizer 208 to optimize. The transformed query may be equivalent to the SOQL query: "Select Id, Name from Contact where Account.Name='Salesforce.com'" (where the Account.Name syntax is Salesforce.com's SOQL syntax for a join to the Account table)

The query request may be received by the Query Optimizer 208 as a logical query based on two logical tables, Contact and Account, with a single filter on the standard Account Name field.

The Query Optimizer 208 is able to apply an existing index (e.g. search name lookup optimization), introducing an additional join to the search_name_lookup table which contains a normalized index on the name field. The in the normalized index may be normalized such that it can be used to return correct results for a case-insensitive comparison based on the rules of any spoken and/or written language. For example, the name may be recognized for English as well as a language that uses accents over certain letters in the alphabet, such as French, and/or a language with a different alphabet from English, such as Greek. The query may be hinted to the Query Optimizer 208 with a table order beginning with the search_name_lookup table and with nested loop joins to the Account and Contact table.

In one or more embodiments, the query may return quickly, since it is able to directly lookup the relevant rows via the index.

System Overview

Figure 5:
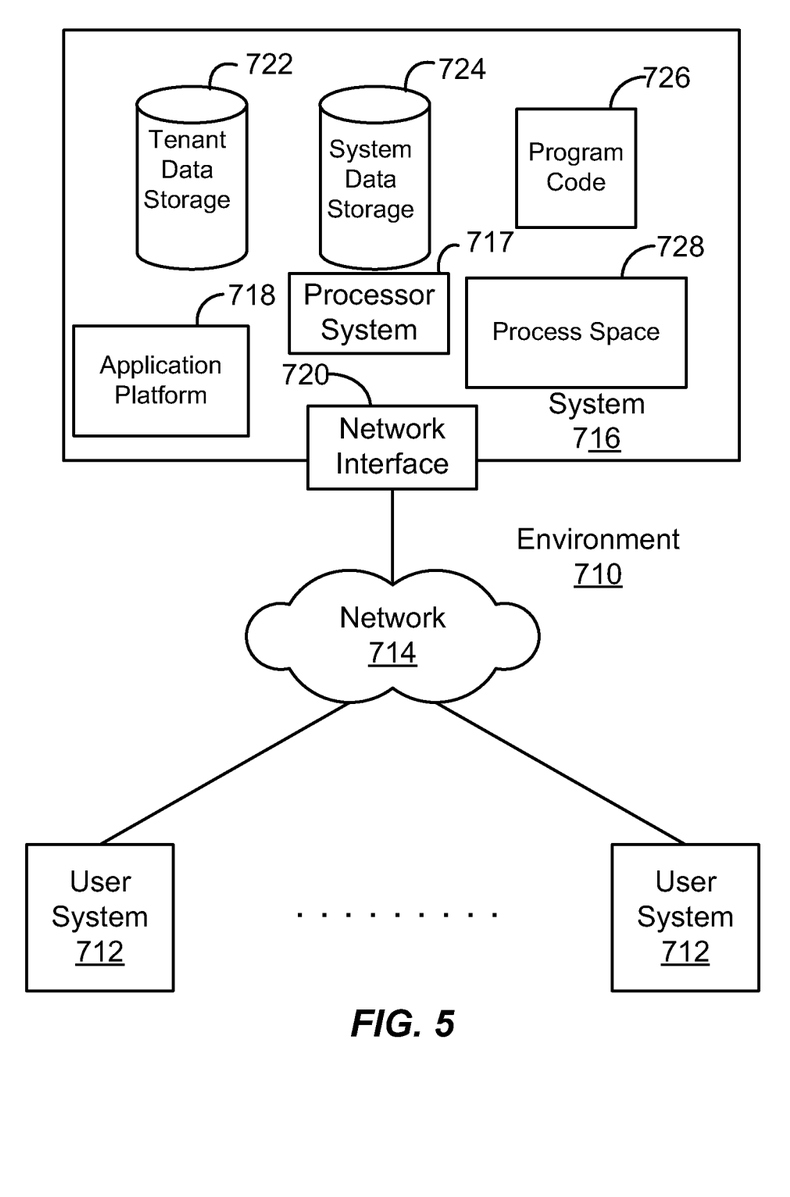
FIG. 5 illustrates a block diagram of an example of an environment wherein an on-demand database service might be used.

FIG. 5 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 5 (and in more detail in FIG. 6) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 5, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 5, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 5 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, Flex, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
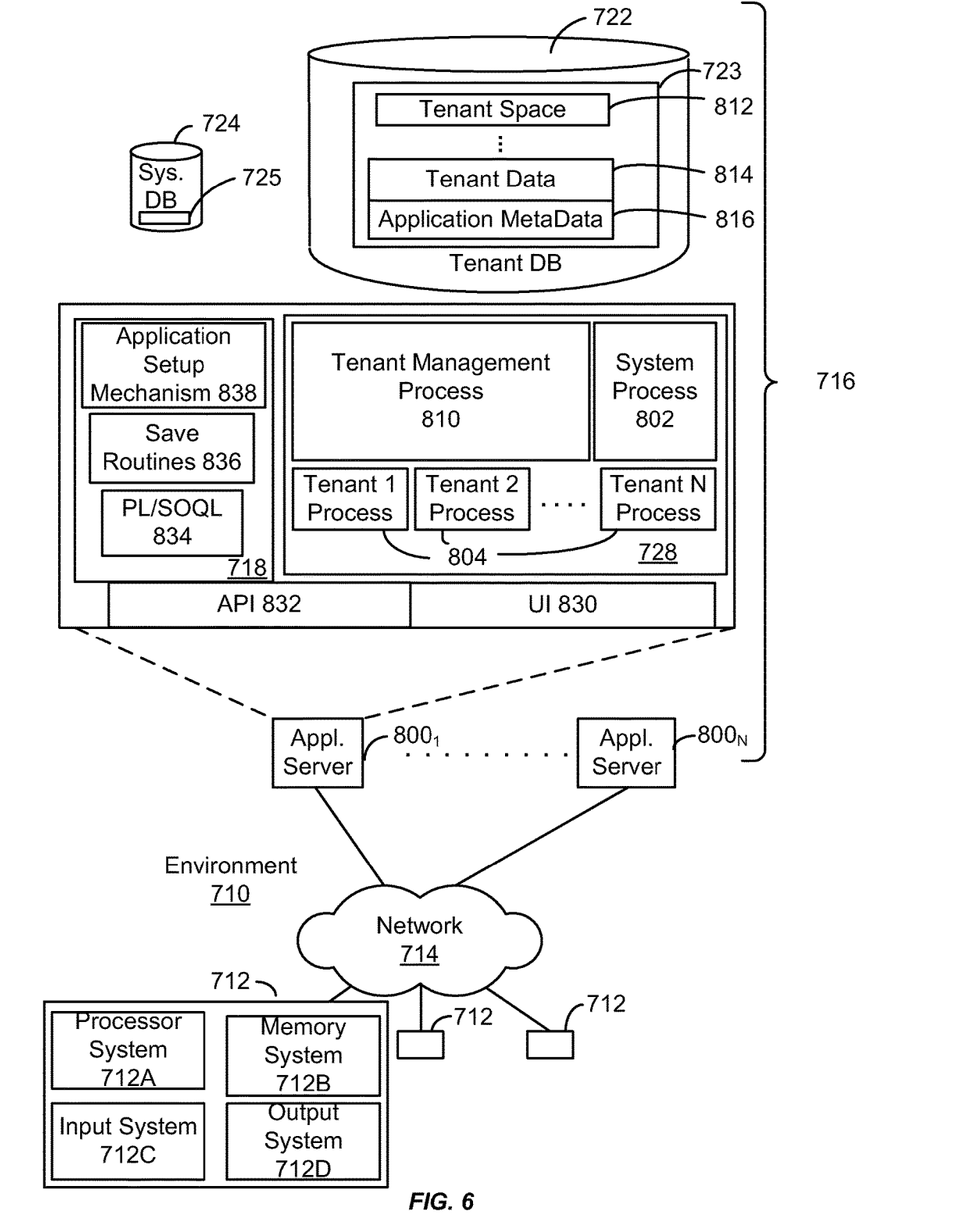
FIG. 6 illustrates a block diagram of an embodiment of elements of FIG. 6 and various possible interconnections between these elements.

FIG. 6 also illustrates environment 710. However, in FIG. 6 elements of system 716 and various interconnections in an embodiment are further illustrated. FIG. 6 shows that user system 712 may include processor system 712A, memory system 712B, input system 712C, and output system 712D. FIG. 6 shows network 714 and system 716. FIG. 6 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 8001-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 5. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 6, system 716 may include a network interface 720 (of FIG. 5) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 8001 might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716)

automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for executing a query by a database system, the method comprising:

receiving a query request with a reference to a first database field in a query predicate, the query predicate comprising a formula referencing a second database field, the query request to filter data returned from the database system in response to the query request, the database system being shared by a plurality of organizations;

transforming the query request to a transformed query request by preprocessing the formula in the query predicate by replacing the reference to the first database field within the query request with at least one reference to the second database field, the at least one reference to the second database field including an index within the database system associated with one of the plurality of organizations; and executing the query request using the transformed query request.

2. The method for executing a query by the database system of claim 1, the method further comprising:

preprocessing the formula by performing an inverse function on a function within the formula.

3. The method for executing a query by the database system of claim 1, the method further comprising:

applying an index to a database field referenced in the formula, wherein the index is for data of a tenant of the multi-tenant database.

4. The method for executing a query by the database system of claim 1, wherein the formula has a nested formula and the formula is flattened during preprocessing.

5. The method for executing a query by the database system of claim 1, the method further comprising:
preprocessing the formula by performing a range scan for the formula.

6. The method for executing a query by the database system of claim 1, the method further comprising:
generating a SQL database request with the transformed query request.

7. A non-transitory computer-readable storage medium having one or more instructions thereon for executing a query in a database system, the instructions when executed by one or more processors causing the one or more processors to carry out:
receiving a query request with a reference to a first database field in a query predicate, the query predicate comprising a formula referencing a second database field, the query request to filter data returned from the database system in response to the query request, the database system being shared by a plurality of organizations;
transforming the query request to a transformed query request by preprocessing the formula in the query predicate by replacing the reference to the first database field within the query request with at least one reference to the second database field, the at least one reference to the second database field including an index within the database system associated with one of the plurality of organizations; and
executing the query request using the transformed query request.

8. The non-transitory computer-readable storage medium of claim 7, the instructions further comprising:
preprocessing the formula by performing an inverse function on a function within the formula.

9. The non-transitory computer-readable storage medium of claim 7, the instructions further comprising:
applying an index to a database field referenced in the formula, wherein the index is for data of a tenant of the multi-tenant database.

10. The non-transitory computer-readable storage medium of claim 7, wherein the formula has a nested formula and the formula is flattened during preprocessing.

11. The non-transitory computer-readable storage medium of claim 7, the instructions further comprising:
generating a SQL database request with the transformed query request.

12. A system for executing a query in a database system, the system comprising:
a processor; and
one or more stored sequences of instructions which, when executed by the processor, cause the processor to carry out:
receiving a query request with a reference to a first database field in a query predicate, the query predicate comprising a formula referencing a second database field, the query request to filter data returned from the database system in response to the query request, the database system being shared by a plurality of organizations;
transforming the query request to a transformed query request by preprocessing the formula in the query predicate by replacing the reference to the first database field within the query request with at least one reference to the second database field, the at least one reference to the second database field including an index within the database system associated with one of the plurality of organizations; and
executing the query request using the transformed query request.

13. The system for executing a query in a database system of claim 12, wherein the one or more stored sequences of instructions which, when executed by the processor, cause the processor to further carry out:
preprocessing the formula by performing an inverse function on a function within the formula.

14. The system for executing a query in a database system of claim 12, wherein the one or more stored sequences of instructions which, when executed by the processor, cause the processor to further carry out:
applying an index to a database field referenced in the formula, wherein the index is for data of a tenant of the multi-tenant database.

15. The system for executing a query in a database system of claim 12, wherein the formula has a nested formula and the formula is flattened during preprocessing.

16. The system for executing a query in a database system of claim 12, wherein the one or more stored sequences of instructions which, when executed by the processor, cause the processor to further carry out:
generating a SQL database request with the transformed query request.

17. The system for executing a query in a database system of claim 12, wherein the one or more stored sequences of instructions which, when executed by the processor, cause the processor to further carry out:
preprocessing the formula by performing a range scan for the formula.

* * * * *